United States Patent
Bailey

[11] Patent Number: 6,128,556
[45] Date of Patent: *Oct. 3, 2000

[54] CMG CONTROL BASED ON ANGULAR MOMENTUM TO CONTROL SATELLITE ATTITUDE

[75] Inventor: David A. Bailey, Glendale, Ariz.

[73] Assignee: Honeywell International Inc., Morristown, N.J.

[*] Notice: This patent is subject to a terminal disclaimer.

[21] Appl. No.: 09/042,515

[22] Filed: Mar. 16, 1998

[51] Int. Cl.[7] .............................. G06F 17/00; G06G 7/76
[52] U.S. Cl. ............................. 701/13; 701/3; 701/4; 701/226; 701/222; 244/166; 244/168; 244/169; 244/165
[58] Field of Search .................. 701/13, 3, 4, 8, 701/9, 120, 222, 226; 244/168, 169, 165, 166, 171, 172, 173, 164

[56] References Cited

U.S. PATENT DOCUMENTS

| | | | |
|---|---|---|---|
| 4,746,085 | 5/1988 | Bruderle | 244/166 |
| 4,949,922 | 8/1990 | Rosen | 244/168 |
| 5,025,381 | 6/1991 | Goodzeit et al. | 701/4 |
| 5,608,634 | 3/1997 | Goodzeit et al. | 701/4 |
| 5,667,171 | 9/1997 | Fowell et al. | 244/165 |
| 5,681,012 | 10/1997 | Rosmann et al. | 244/165 |
| 5,765,780 | 6/1998 | Barskey et al. | 244/165 |
| 5,806,804 | 9/1998 | Goodzeit et al. | 244/169 |

FOREIGN PATENT DOCUMENTS

| | | |
|---|---|---|
| 0672507A1 | 2/1995 | European Pat. Off. . |
| 9523054 | 8/1995 | WIPO . |

OTHER PUBLICATIONS

Krzysztof Tehori and Robert Muszynski, "Singular Inverse Kinematic Problem For Robotic Manipulators: A Normal Form Approach" (Feb. 1998).

S. R. Vadali and S. Krishnan, "Suboptimal Command Generation For Control Moment Gyroscopes and Feedback Control of Spacecraft" (Nov.–Dec. 1995).

Mark D. Kuhns and Armando A. Rodriguez, "Singularity Avoidance Control Laws for a Multiple CMG Spacecraft Attitude Control System" (Jun. 1994).

*Primary Examiner*—Jacques H. Louis-Jacques
*Attorney, Agent, or Firm*—Robert E. Greenstien

[57] ABSTRACT

Control moment gyros in an array are rotated to reorient a satellite. Gyro angle is selected from one of three values based upon whether the stored angular momentum for the desired angle is below a singularity free value, greater than the singularity free value or is greater than the maximum available stored angular momentum.

2 Claims, 3 Drawing Sheets

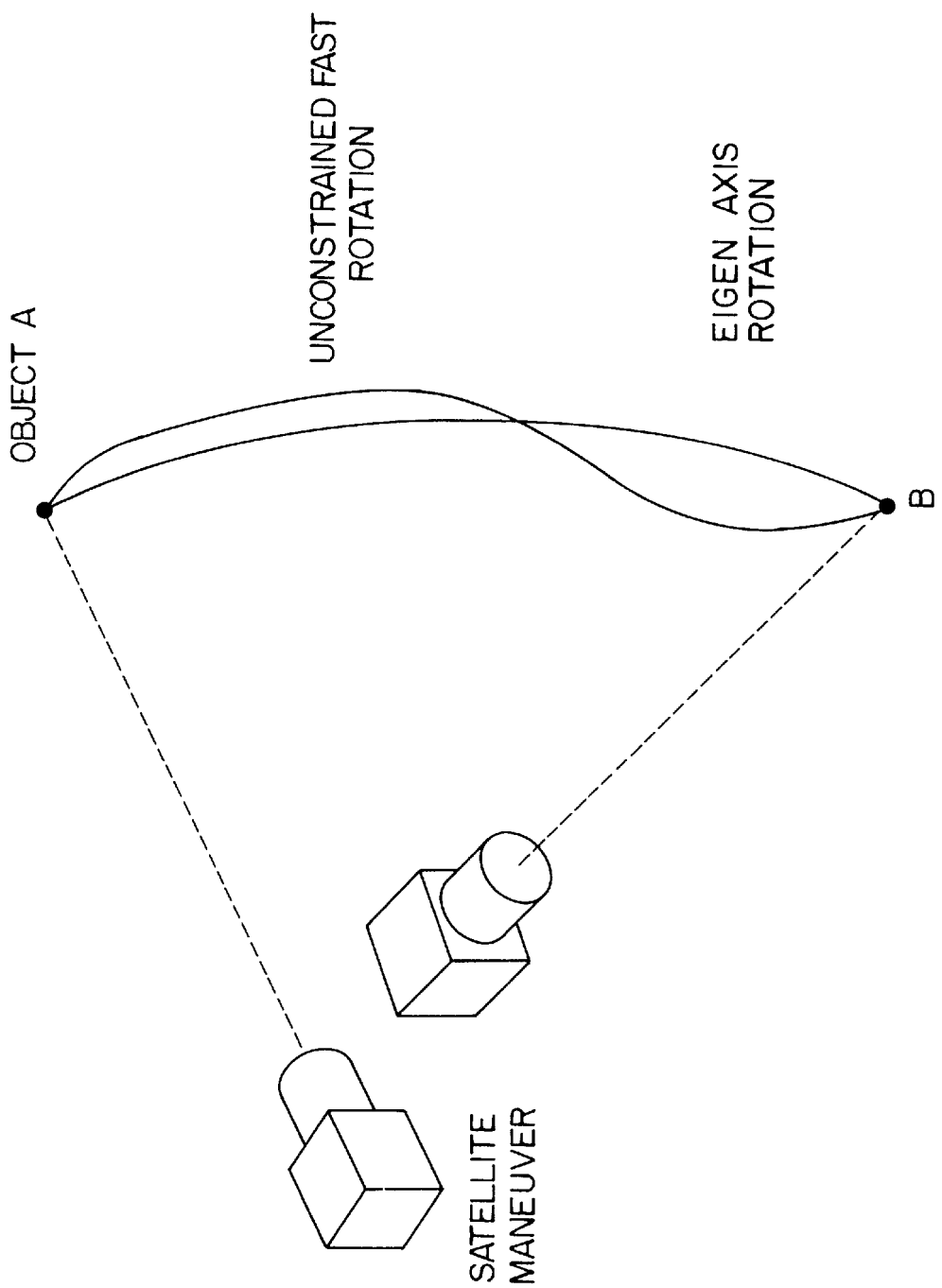

CM G CONTROL BASED ON ANGULAR MOMENTUM TO CONTROL SATELLITE ATTITUDE

CROSS REFERENCE TO RELATED APPLICATIONS

This application discloses material discussed in the previously filed application titled Orienting A Satellite With Controlled Momentum Gyros, by David A. Bailey, filed on Sep. 2, 1997, Ser. No. 08/923,742, now pending and these simultaneously filed applications: Robust Singularity Avoidance In A Satellite Attitude Control, by Bong Wie, David A. Bailey and Christopher J. Heiberg, Ser. No. 09/039,959, now U.S. Pat. No. 6,039,290; A Continuous Attitude Control Which Avoids CMG Array Singularities, by David A. Bailey, Christopher J. Heiberg and Bong Wie, Ser. No. 09/038,869, now pending; Escaping Singularities In A Satellite Attitude Control, by Christopher J. Heiberg and David A. Bailey, Ser. No. 09/034,640, now U.S. Pat. No. 6,047,927.

TECHNICAL FIELD OF THE INVENTION

This invention relates to satellites and robotic systems, for example controlling the orientation of a satellite using a plurality of control moment gyros (CMG).

BACKGROUND OF THE INVENTION

The attitude of an agile spacecraft or satellite is often maintained and adjusted with a control moment gyro array because those devices provide high torque and torque amplification. A typical CMG is a rotating mass suspended on a gimbal with an actuator to rotate it on the gimbal axis, producing torque and accumulating angular momentum. Angular momentum is the integral of torque over time. An array of n>3 CMGs is often used, allowing attitude control with some redundancy. Each CMG has an angular momentum (h) constrained essentially to a plane, the angular momentum vector of the gyro is nearly orthogonal to the gimbal axis. The error in orthogonality is small enough that it does not affect the operation of the CMG, the array of CMGs, or the attitude control of the satellite. The wheel speed of the CMG is essentially constant in most applications, but does not have to be for this invention to work. The torque produced by the CMG, Q is the result of the cross product $Q=\dot{\delta} \times h$, where $\dot{\delta}$ is the gimbal rate and h is the angular momentum of the rotor, if varying wheel speed is incorporated then there is an additional term $Q=\dot{\delta} \times h + \dot{h}$, where the angular momentum h is defined as $h=J\Omega$, and $\dot{h}=J\dot{\Omega}$, where J is the moment of inertia of the rotating wheel and $\Omega$ is the rotational rate of the wheel.

Classically the attitude control calculates the desired attitude rates for the satellite $\omega_c$, being the three axis attitude rates. The gimbal angle ($\delta$) rates for the CMG array are calculated using the pseudo inverse control law, $\dot{\delta}=A^T(AA^T)^{-1}J_s\omega_c$, where $J_s$ is the satellite moment of inertia matrix, and A is the Jacobian of CMG array angular momentum with respect to gimbal angle, $$A = \frac{\partial h}{\partial \delta},$$

where h is the sum of the angular momentum of the CMG array, $$h = \sum_{i=1}^{n} h_i.$$

Since the A matrix is a function of the gimbal angles and the gimbal angels change in order to produce torque on the spacecraft the rank of A can drop from 3 to 2, which is a singular condition and the pseudo inverse cannot be calculated.

The Ser. No. 08/923,742 application, referenced above, provides a solution that primarily uses and an open loop to maintain the desired trajectory. In this invention, CMG angles are controlled directly instead of controlling only the rate of change of gimbal angle

DISCLOSURE OF THE INVENTION

An object of the present invention is to significantly increase the speed in reorienting a satellite between two objects by utilizing more of the available angular momentum from the CMGs.

According to the invention, the attitude control calculates the angular momentum for the CMGs, instead of the desired torque. The angular momentum is directly used to calculate the gimbal angles of the CMGs. Based on mapping the angular momentum into three regions.

One is within the largest singularity free region surrounding the origin, the second is region that is beyond the angular momentum capability of the CMG array, and the third lies between the first two. If the angular momentum lies within the singularity free ellipsoid, the value of the angular momentum is used to calculate the gimbal angles. Otherwise the gimbal angles are calculated for the point on the ellipsoid that lies on a line between the angular momentum and the origin. The saturation angular momentum in the direction of the desired angular momentum is calculated along with gimbal angles. If the commanded angular momentum is greater than the saturation angular momentum then the saturation gimbal angles are used, otherwise the gimbal angles are the interpolated values between the saturation gimbal angles and the ellipsoid gimbal angles.

A feature of this approach is that it allows for the use of the full angular momentum envelope.

Another feature is that CMG control is free from the singularities that are caused by the use of a pseudo inverse in the CMG control law.

Another feature is that the invention can be used to avoid singularities in robotic systems with similar control problems.

Other objects, benefits and features of the invention will be apparent from the following discussion of one or more embodiments.

BRIEF DESCRIPTION OF THE DRAWING

FIG. 3 illustrates two possible paths for reorienting between two objects.

BEST MODE FOR CARRYING OUT THE INVENTION

Figure 1:
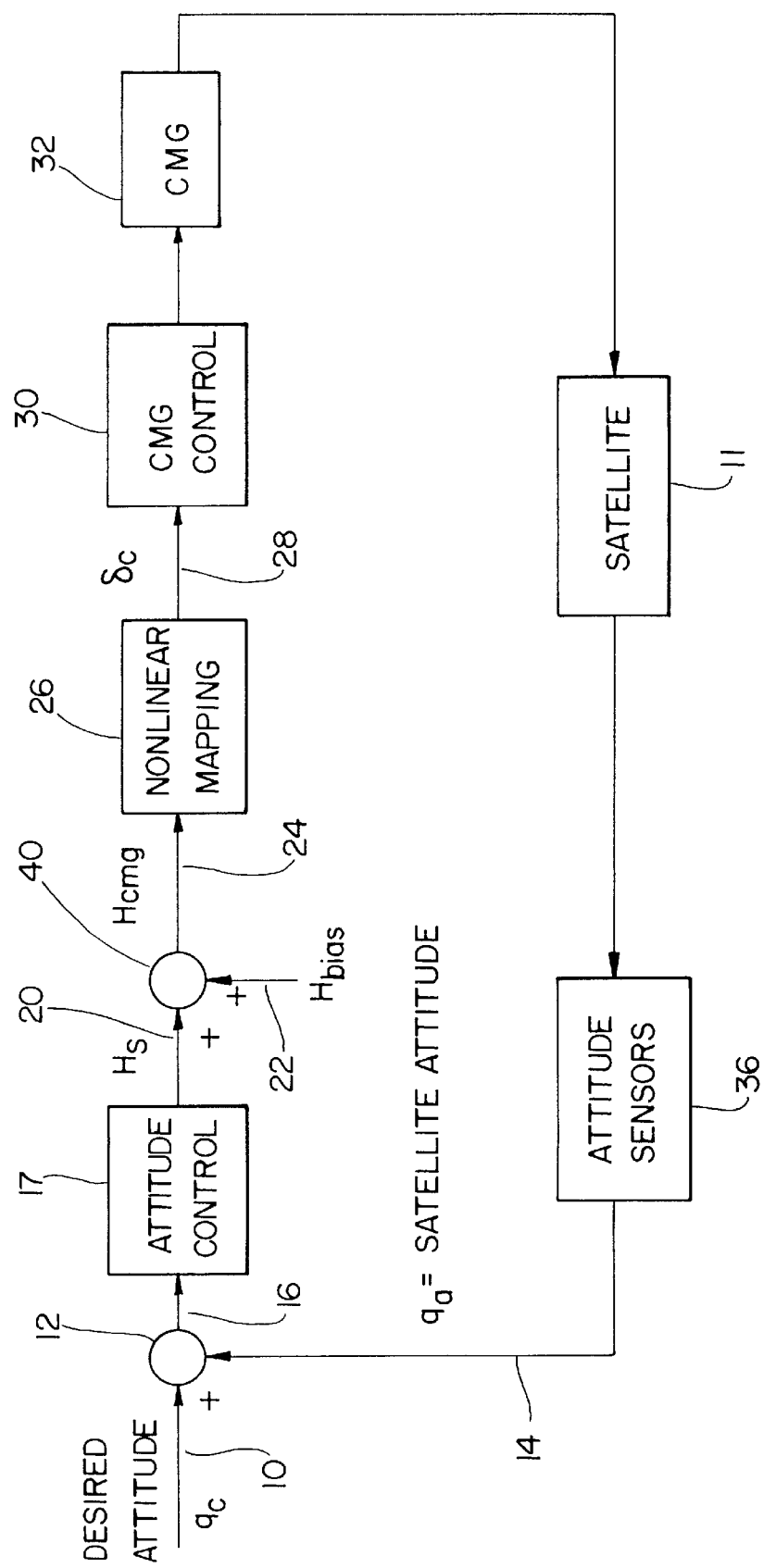
FIG. 1. is a functional block diagram showing a control embodying the present invention to rotate a satellite in response to commanded rotation signal $q_c$.
Figure 2:
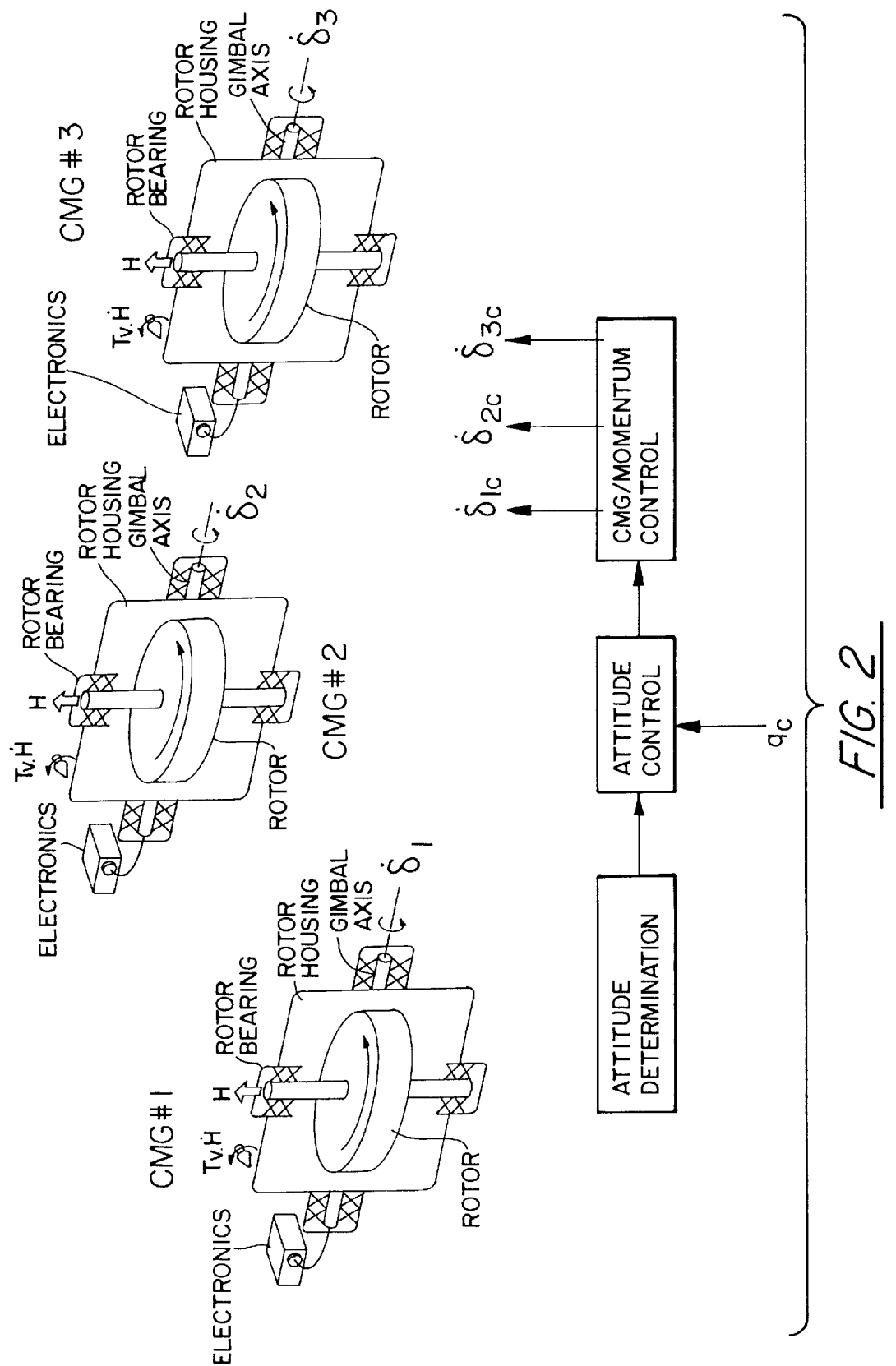
FIG. 2 is a block diagram showing a satellite with CMGs that are rotated to change the satellite's attitude in response to individually produce angular rate signals.

It will be appreciated that FIG. 1 shows function blocks that may be implemented through hardware or software, preferably the latter in a computer based satellite control containing one or more signal processors programmed to produce output signals to control CMGs on the satellite as explained hereafter. Fundamentally the process is shown for a single signal path between two points, but it should be understood that single lines represent vector data which is 3 dimensional for the satellite attitude, attitude rate and torque, and n dimensional for the signals related to the n CMGs. FIG. 2 shows three (n=3) CMGs. The control scheme shown in FIG. 1 is used to pan or rotate the satellite on its axis from the line of sight view of an object A to a line of sight view of object B in FIG. 3. A typical closed loop control follows an eigen axis rotation path "old" by controlling the CMG's based on the actual (determined) from the attitude determination system ADS as in FIG. 3) and the desired path attitude. The invention, however, is not constrained to follow an eigen axis path as will be explained.

In the embodiment shown in FIG. 1, the desired attitude 10 for a satellite 11 is generated by a mission planner in a usual form, a quaternion, although any method can be used with the invention. The desired attitude 10 is compared at 12 with actual satellite attitude 14, producing an error 16 that is applied to an attitude control 17 according to the following: $H_s = J(k_1 q_e + k_2 \omega_e)$ where $H_s$ is the desired angular momentum of the satellite, J is the moment of inertia tensor of the satellite, $q_e$ is the first three terms of the quaternion error, $\omega_e$ is the angular error rate, and $k_1$ and $k_2$ are gains. The base angular momentum $H_{bias}$ 22 is added at 40 to the desired satellite angular momentum $H_s$ 20, resulting in the total angular momentum delivered by the CMGs 24. The desired angular momentum is mapped at 26 to get, at 28, the desired CMG angles $\delta_c$ (as opposed to CMG rate). This process involves three exclusive criteria for a given desired angular momentum. There are three regions of angular momentum that define a calculation method for the desired gimbal angle. The smallest region is if the angular momentum falls within an ellipsoid containing a singularity free space. The largest region is if the commanded angular momentum is greater than the saturation angular momentum of the CMG array. Then the saturation angular momentum is used to calculate the gimbal angles. The middle region is an interpolated value from the smallest and largest regions.

The mapping from angular momentum to gimbal angle is done differently, in three regions. If the angular momentum $H_{cmg}$ is within the singularity free ellipsoid, $$\frac{h_1^2}{a_1^2} + \frac{h_2^2}{a_2^2} + \frac{h_3^2}{a_3^2} < 1,$$

where $h_i$ is the angular momentum component in the particular direction and $a_i$ is the radius in the ith direction, then the desired angular momentum $H_{desired}$ is set equal to $H_{cmg}$. If, however, the angular momentum $H_{cmg}$ is outside that ellipsoid, $H_{desired}$ is $$H_{desired} = \frac{H_{CMG}}{\sqrt{\frac{h_1^2}{a_1^2} + \frac{h_2^2}{a_2^2} + \frac{h_3^2}{a_3^2}}},$$

so that gimbal angles are based the singularity free ellipsoid $\delta$=starting angle $H = A(\delta)$ Do $$A = \frac{\partial H}{\partial \delta}$$

$\delta_{n+1} = \delta_n + A^T(AA^T + kI)^{-1}(H_{desired} - H_n)$ $H_{n+1} = A(\delta_{n+1})$ $e_{n+1} = H_{desired} - H_{n+1}$ while $\sqrt{e_n^T e_n} > tolerance$.

The invention has been explained in the context of a satellite control, but it can be used in systems, such as robotic systems, which can encounter singularities. With the benefit of the previous discussion of the invention, one of ordinary skill in the may be able to modify the invention and the components and functions that have been described in whole or in part without departing from the true scope and spirit of the invention.

What is claimed is:

1. A satellite attitude control comprising a plurality of control moment gyros, an attitude control comprising signal processing means for providing a gimbal angle signal, for each control moment gyro, to operate an actuator to rotate each control moment gyro to change the attitude of the satellite wherein:

the signal processing means comprises:
  means for receiving a first signal representing a desired satellite attitude;
  means for receiving a second signal representing actual satellite attitude;
  means for producing an attitude error signal from said first and second signals;
  means for receiving said attitude error signal and producing a desired gimbal angle for a control moment gyro with one of a first, second or third values:
    the first value being the desired gimbal angle if a stored angular momentum for the desired gimbal angle is less than a predetermined singularity free producing value;
    the second value being an interpolation between the singularity free value and a maximum angular momentum value representing the maximum available angular momentum if the stored angular momentum for the desired gimbal angle is between said saturation free value and said maximum angular momentum value; and the third value being said maximum angular momentum value for the desired angle if the stored angular momentum for said desired gimbal angle is greater than said maximum angular momentum value.

2. A robotic system having an actuator controlled by a signal processor according to a control law, wherein the signal process comprises:

means for receiving a first signal representing a desired actuator position;

means for receiving a second signal representing actual actuator position;

means for producing a position error signal from said first and second signals;

means for receiving said position error signal and producing a desired actuator position with one of first, second or third values:

the first value being the desired actuator position if said position is associated with a singularity free position;

the second value being an interpolation between the singularity free position and a maximum actuator position; and the third value being said maximum position if said desired actuator position is greater than said maximum position.

* * * * *